United States Patent

Freeman

[11] 3,921,957
[45] Nov. 25, 1975

[54] MEANS TO MINIMIZE BINDING OF SLAB GATE VALVE

[75] Inventor: John W. Freeman, Houston, Tex.

[73] Assignee: ACF Industries, Incorporated, New York, N.Y.

[22] Filed: Feb. 18, 1975

[21] Appl. No.: 550,888

[52] U.S. Cl. .............. 251/327; 251/328; 137/546
[51] Int. Cl.² ............................... F16K 3/316
[58] Field of Search ............ 251/328, 327; 137/546

[56] References Cited
UNITED STATES PATENTS

| | | | |
|---|---|---|---|
| 3,273,853 | 9/1966 | Pool et al. | 251/328 X |
| 3,334,653 | 8/1967 | Works et al. | 251/328 X |

Primary Examiner—Arnold Rosenthal
Attorney, Agent, or Firm—Eugene N. Riddle

[57] ABSTRACT

A gate valve structure having a slab gate and a pair of opposed seat assemblies on opposite faces of the slab gate. A generally U-shaped spacer member of substantially the same thickness as the slab gate is loosely positioned between the opposed seat assemblies outwardly of the slab gate to maintain a predetermined minimum spacing between the seat assemblies. The U-shaped spacer member has a smaller thickness portion thereof in its center section to provide flexibility for permitting alignment of the spacer member upon canting or cocking of the seat assemblies.

6 Claims, 6 Drawing Figures

MEANS TO MINIMIZE BINDING OF SLAB GATE VALVE

BACKGROUND OF THE INVENTION

Heretofore, as shown in U.S. Pat. No. 3,334,653 dated Aug. 8, 1967, a gate valve structure having a nonported slab gate member and floating seats within the valve chamber on opposed faces of the nonported slab gate member have been provided, and a generally U-shaped spacer member has been positioned in the valve chamber between the seat assembly and outwardly of the slab gate. In a "so-called" nonconduit or nonported type gate valve, when the slab gate is removed or substantially removed from its position between the valve seats in an open position of the valve, the seats may move toward one another. When the seats are allowed to move, sediment or foreign matter within the valve might be accumulated in the seat recesses behind the seats. When this occurs, subsequent movement of the gate to a closed position will cause binding of the gate between the seats because the deposit of foreign matter behind the seats prevents the seats from moving fully into their recesses.

To eliminate the above-mentioned difficulty, the arrangment shown in U.S. Pat. No. 3,334,653 dated Aug. 8, 1967 provided a movable U-shaped seat spacer positioned within the valve chamber outwardly of the slab gate between the pair of opposed floating seats. The U-shaped seat spacer is of substantially the same width or thickness as the gate and maintains a predetermined minimum spacing between the seat assemblies as the gate is moved to the open position of the valve structure. However, at times the "floating" seats might cant or cock relative to the recesses in which the seats fit and if the spacer member does not follow the canting of the seats then possible binding of the slab gate might occur upon movement of the slab gate member to a closed position.

BRIEF DESCRIPTION OF THE PRESENT INVENTION

The present invention is directed to a gate valve structure having a nonported slab gate member and a generally U-shaped spacer having parallel sides connected by an arcuate intermediate portion positioned between the seats outwardly of the slab gate. The spacer is of the same thickness as the slab gate and varies generally between around one inch and four inches in thickness. When the spacer member does not flex or follow any canting or cocking of the seat assemblies, binding or perhaps misalignment of the slab gate may occur. To permit the spacer member to flex and to cant or move with the seat assemblies, the intermediate portion of the spacer member is provided with a small thickness portion thereof such as by notching or tapering the center of the U-shaped spacer member so that the spacer member may flex about the small thickness portion thereof. In this manner, the spacer may cant or cock to move with the seats and thereby permit accurate alignment of the gate member with the seats to minimize any leakage or binding of the slab gate.

The invention accordingly comprises a construction hereinafter described, the scope of the invention being indicated in the following claims.

In the accompanying drawings in which one of various possible embodiments of the invention is illustrated, FIG. 1 is a longitudinal sectional view, certain parts shown in elevation, of the gate valve structure comprising the present invention;

FIG. 6 is an elevation of the U-shaped spacer removed from the valve structure.

Figures 1, 2:
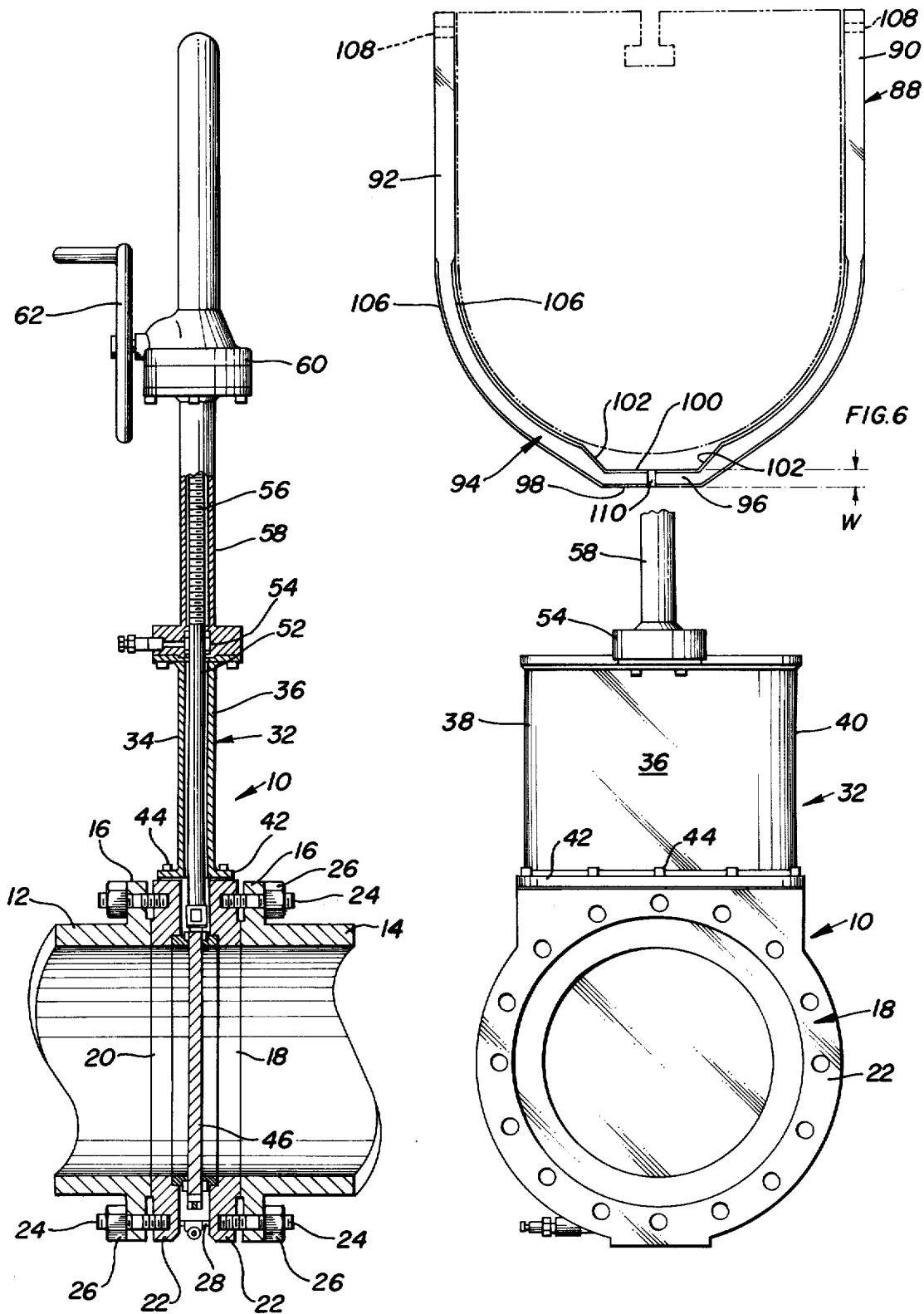
FIG. 2 is a partial front elevation of the invention shown in FIG. 1.
Figure 3:
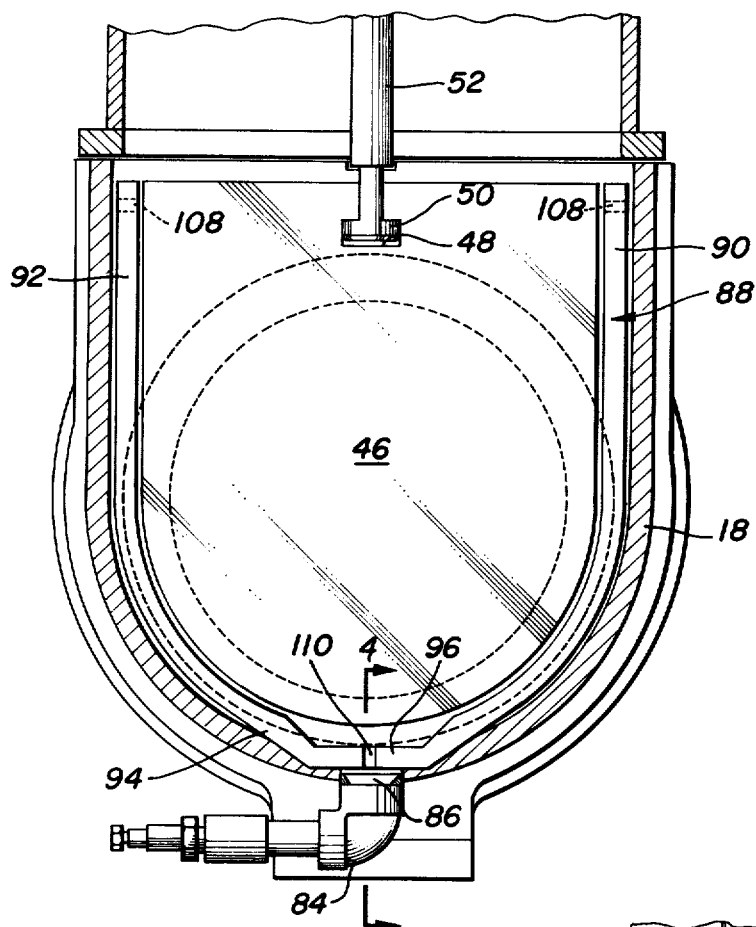
FIG. 3 is an enlarged transverse sectional view of the invention shown in FIGS. 1 and 2 illustrating the spacer member and the gate member positioned within the valve chamber.

Referring now to the drawings for a better understanding of the invention, a valve 10 is illustrated positioned between conduits 12 and 14 having flanges 16 thereon. Valve structure 10 includes a pair of opposed valve body portions 18 and 20 having flanges 22 thereon connected to flanges 16 by suitable studs 24 and nuts 26. A web or housing 28 is secured between the generally parallel body portions 18 and 20 to space body portions 18 and 20 a predetermined distance therebetween for defining an open ended valve chamber 30.

A bonnet member 32 is formed by generally parallel walls 34 and 36 connected by arcuate end walls 38 and 40. The lower end portion of bonnet 32 has flanged end 42 thereon and bolts 44 secure bonnet 32 onto body portions 18 and 20. Bonnet 32 provides an upper chamber to receive a nonported slab gate member 46. Slab gate 46 is provided with a slot 48 in its upper end and head 50 of a steam 52 fits within slot 48. Stem 52 extends through a packing chamber 54 and is externally threaded at 56 adjacent its upper end. A yoke tube 58 extends about the upper end portion of stem 52 and a stem operating mechanism indicated generally at 60 includes a gear mechanism which may be suitably operated by a handwheel 62 for raising and lowering gate 46. In the open position of gate 46, gate 46 is received within bonnet 32.

Figure 4:
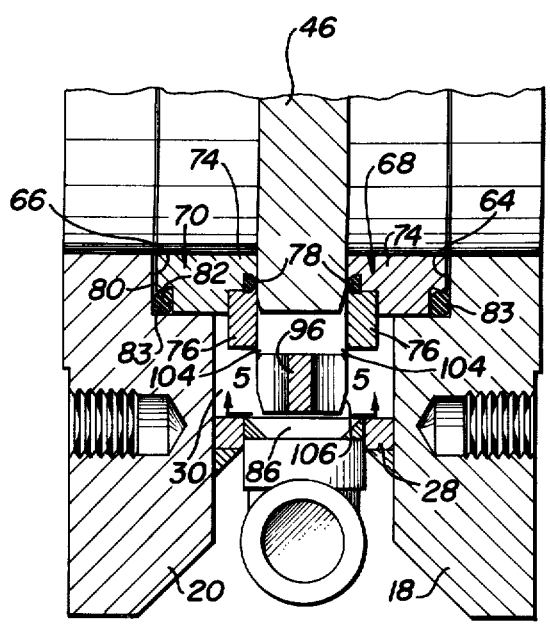
FIG. 4 is an enlarged section taken generally along line 4—4 of FIG. 3 and showing the gate member positioned between the seat assemblies.

As shown particularly in FIG. 4, body members 18 and 20 define opposed respective seat recesses 64 and 66. Seat assemblies indicated generally 68 and 70 are pressed or fitted within the respective recesses 64 and 66. Seat assemblies 68 and 70 are identical, each having an annular body portion 74 and an annular retaining ring 76 securing a face seal 78 in a groove between retainer 76 and body portion 74. Face seal 78 may be formed of a suitable elastomeric sealing material such as synthetic rubber or the like, for example, and having a small sealing portion thereof extending beyond the sealing face of the respective seat assembly for sealing engagement with adjacent surfaces of gate 46. The back face 80 of annular body member 74 has a groove 82 therein which receives an O-ring 83. The diameter of O-ring 83 is larger in cross section than the depth of groove 82 thereby providing sealing contact with the surface forming adjacent recess 64 or 66 at all times. Retainer members 76 extend outwardly a substantial distance beyond the outer peripheral surface of body members 68 and 70 to form a continuation of the sealing face of the seat assemblies 68 and 70.

As shown in FIG. 4, in the event of the accumulation of any sediment or foreign matter within the lower portion of the valve chamber adjacent the housing or web member 28, a drain fitting generally indicated at 84 is secured adjacent an opening 86 in web member 28. A suitable manual control means may be provided to allow the bleeding of fluid and sediment from the valve chamber when desired.

Forming the present invention is U-shaped spacer member shown specifically in FIG. 6 and generally indicated by numeral 88 comprising generally parallel sides 90 and 92 connected by an intermediate arcuate section 94. The apex or center of arcuate section 94 has a center portion 96 of a reduced width W formed between a generally flat base surface 98 and a parallel upper flat surface 100 as shown particularly in FIG. 6. The flat base surface 98 rests on the bottom portion of web 28 so that it engages web 28 at two spaced locations. It is desirable that a relatively large contact bearing area be provided between spacer 88 and the adjacent face sealing surfaces of retainers 76 in order to maintain seat assemblies 68 and 70 in proper position and alignment with respect to gate 46. For that purpose, spacer 88 includes increased width portions 102 adjacent the reduced width center portion 96 formed between flat surfaces 98 and 100. However, as shown in FIG. 4, reduced width portion 96 is spaced from the adjacent retainers 76 at 104 to provide a flow path or clearance through which sediment or foreign matter within the valve chamber may pass from between seat assemblies 68 and 70 into the area formed at 30 for flowing into opening 86 and drain fitting 84.

Spacer member 88 has beveled edge portions 106 which serve to permit spacer member 88 to cam or force seat assemblies 68 and 70 into valve recesses 64 and 66 upon insertion of spacer member 88 within the valve chamber. Spacer member 88 has upper openings 108 therein which allow the insertion of hooks for the purpose of removing spacer member 88 from the valve chamber.

At times, seat assemblies 68 and 70 may be canted or cocked with respect to recesses 64 and 66 and when this occurs, it is desirable that spacer member 88 maintain its contact with seat assemblies 68 and 70 along their entire adjacent faces so that binding or misalignment not occur upon movement of gate member 46 to open position. For this purpose, it is desirable that spacer member 88 be flexible so that it might move with seat assemblies 68 and 70 upon any cocking or canting thereof. The thickness of slab gate 46 and spacer 88 is generally the same and ranges from around one inch to four inches in thickness. With a thickness of this amount, spacer member 88 is not sufficiently flexible even with a reduced width center portion 96 to permit side 90 to move in a direction axially of the flow line relative to side 92. Spacer 88 is normally made of the same material as gate 46, such as, for example, steel having a minimum yield strength of around 36,000 psi.

Figure 5:
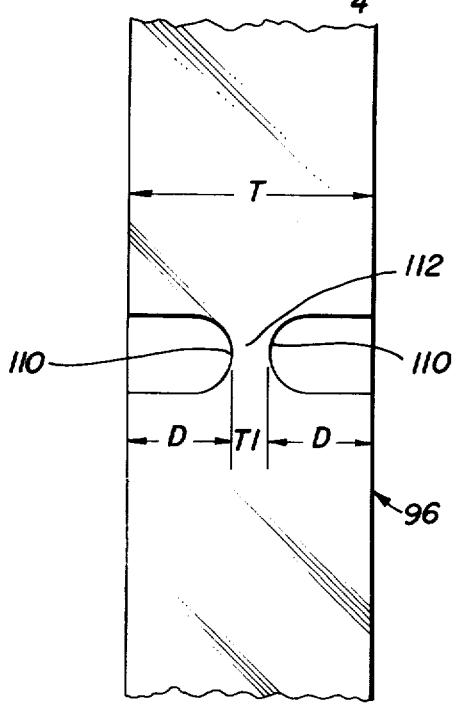
FIG. 5 is a view looking generally along line 5—5 of FIG. 4 and illustrating the reduced thickness portion of the spacer member to provide flexibility.

The reduced width W of center portion 96 and the reduced thickness T1 shown in FIG. 5 in order to provide the desired flexibility will vary depending primarily on the total thickness T of spacer member 88 and the type of material from which spacer member 88 is constructed. When employing a spacer member 88 of between one inch and four inches in total thickness T1 and formed of steel having a minimum yield strength between around 36,000 and 40,000 psi, width W of spacer member 88 would vary between around ½ inch and 2½ inches and thickness T1 would vary between around 3/16 inch and ¾ inch. To obtain thickness T1 a pair of opposed slots or cutaway portions 110 are provided to form reduced a thickness portion 112 between slots 110. As a specific example, thickness T of the spacer member 88 and gate member 46 may be 1.625 inches and slots 110 each may have a depth D of 11/16 inch terminating in a radius struck from an arc of 0.250 inch to provide a reduced thickness T1 of 0.250 inch.

What is claimed is:

1. A gate valve structure having a valve body with a gate chamber therein, a nonported slab gate valve member disposed within the valve chamber and being movable between open and closed positions to control the flow of fluid through the valve with the gate valve member being of a uniform thickness, means for moving the gate valve member between open and closed positions, a pair of spaced opposed movable seat assemblies within the valve chamber having sealing faces thereof in sealing engagement with the gate valve member in the closed position of the valve, a generally U-shaped integral spacer member loosely positioned within the valve chamber between the seat assemblies and being spaced from the outer peripheral surface of the gate valve member, the U-shaped spacer member being of substantially the same thickness as the thickness of the gate valve member to maintain a predetermined minimum spacing between the seat assemblies, said U-shaped spacer member having a lower intermediate section thereof supported on the lower wall of the valve body, said intermediate section of the U-shaped spacer member having a reduced width and thickness to provide flexibility to the generally parallel sides of the spacer member for permitting relative movement between the sides of the spacer member to minimize misalignment of the gate valve member with respect to the seat assemblies.

2. A gate valve structure as defined in claim 1 wherein an opening is formed in the lower wall of the valve body adjacent the spacer member and suitable drain means are in fluid communication with the opening to permit the flow of sediment from the valve body.

3. A gate valve structure as sets forth in claim 1 wherein the reduced thickness intermediate section of the spacer member comprises a pair of opposed arcuate cutout portions to provide a reduced thickness portion between the cutout portions.

4. A gate valve structure as set forth in claim 1 wherein said U-shaped spacer member has an intermediate section thereof formed with a lower flat surface and an upper flat surface to define therebetween a reduced width for the intermediate section between the generally parallel upper and lower surfaces thereof, the reduced width providing a clearance between the retainers of the seat assemblies and the spacer member to permit a clearance for the flow of sediment from the valve chamber.

5. A gate valve structure as set forth in claim 1 wherein each of aid seat assemblies includes an annular body portion having a sealing face in engagement with the slab gate valve member in the closed position of the gate valve structure, the sealing face having an annular groove therein and a resilient sealing member positioned within the annular groove, and an annular retainer defining the outer periphery of the groove and extending outwardly beyond the outer periphery of the annular body portion to provide a contact area for the U-shaped spacer member.

6. A gate valve structure as set forth in claim 5 wherein the edges of said spacer member are beveled to permit easy insertion of the spacer member between the retainers of the seat assemblies and to aid in camming or forcing the seat assemblies into seated position within the recesses defining the inlet and outlet of the valve structure.

* * * * *